Feb. 27, 1968   F. K. HOLBROOK   3,370,527
APPARATUS FOR FINISHING CITRUS JUICES
Filed Feb. 23, 1966
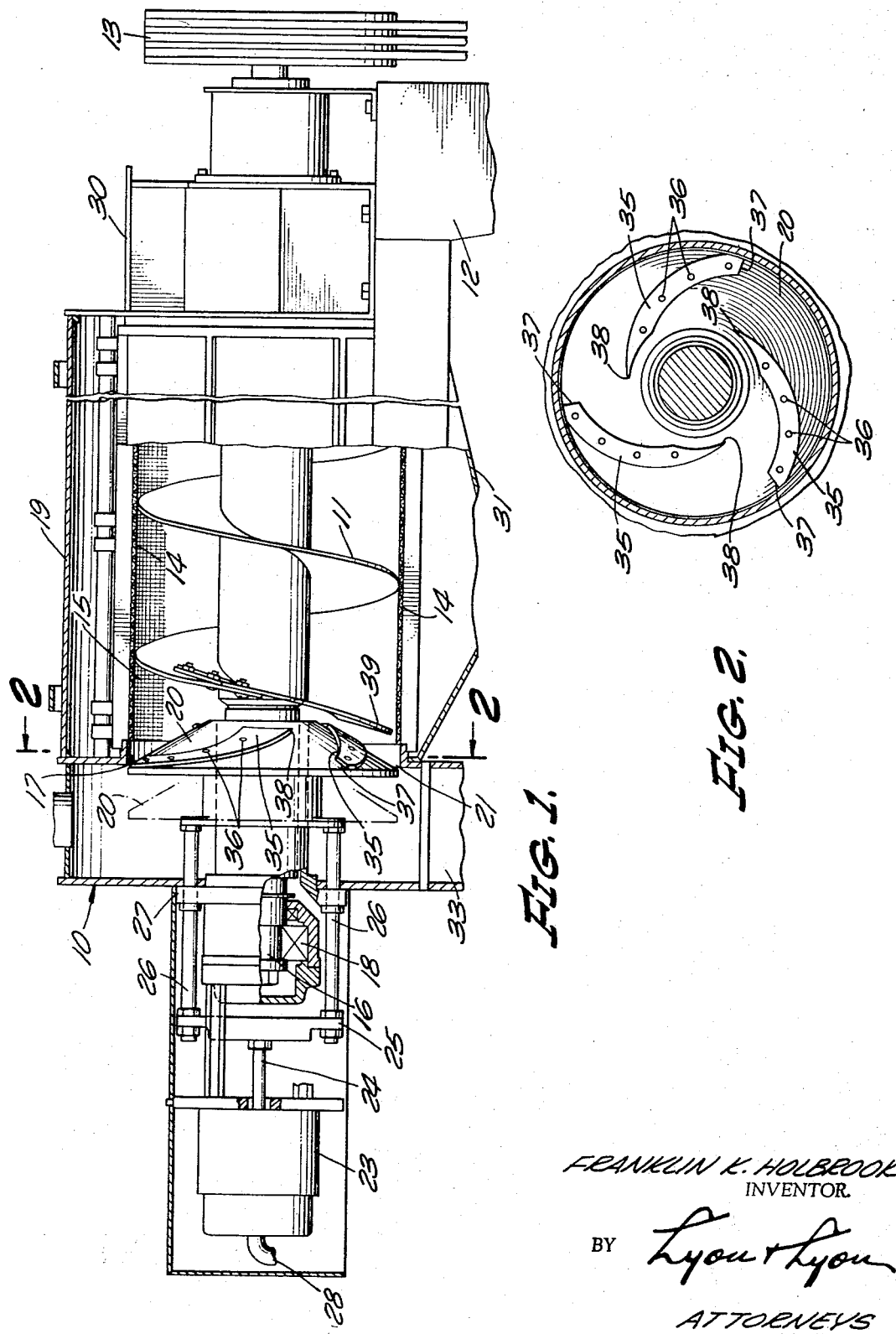
FRANKLIN K. HOLBROOK
INVENTOR.
BY Lyon & Lyon
ATTORNEYS

United States Patent Office 3,370,527
Patented Feb. 27, 1968

3,370,527
APPARATUS FOR FINISHING CITRUS JUICES
Franklin K. Holbrook, Whittier, Calif., assignor to Brown Citrus Machinery Corporation, Whittier, Calif., a corporation of California
Filed Feb. 23, 1966, Ser. No. 529,550
1 Claim. (Cl. 100—147)

ABSTRACT OF THE DISCLOSURE

A fruit juice extractor in which a rotary feed screw operating within screen walls for outflow of juice, forces the pulp against a non-rotary cone member having a plurality of ribs extending outwardly thereon in the direction of rotation of the feed screw and exceeding one-quarter turn.

---

This invention relates to apparatus for the extraction of juices from fruits, vegetables and the like, and is particularly directed to improvements in screw presses of the type having a screen enclosing a rotary screw and having a nonrotary axially movable cone at the discharge end of the screen chamber. Rotation of the screw causes juices to be expelled through the screen and the solid material is discharged through a ring orifice defined between the axially movable cone and a stationary seat. In the extraction of juices from fibrous type fruits and vegetables, some difficulty has been encountered in obtaining maximum juice extraction without blocking the annular discharge passage around the cone through which the solid material passes. In order to overcome this difficulty, a helical member has been placed on the end of the screw adjacent the cone which extends helically around the cone and has a pointed extremity adjacent the outlet end of the discharge passage. Such a device is shown in Youd Patent No. 2,775,191 granted Dec. 25, 1956.

While this helical member or prong is satisfactory for many types of fruit, on certain material it has been extremely difficult to strengthen the prong enough to prevent it from gradually bending out of shape so that it either fails to sweep the proper area adjacent the cone or deforms sufficiently under pressure to cause damage to the enclosing screen. A typical case in which the rotating prong has been found to be unsatisfactory is in connection with the extraction of oil emulsion liquor from lemon flavedo.

It is the principal object of this invention to eliminate the protruding rotary prong or to supplement it with other means for moving the solid material over the cone and discharging it through the ring orifice to avoid packing solid and plugging of the discharge end of the device. This object has been achieved by mounting a plurality of stationary curved fingers on the surface of the discharge cone. The fingers each extend in a spiral path in the direction of rotation of the screw and leading to the large end of the cone.

Other and more detailed objects and advantages will appear hereinafter.

In the drawings, FIGURE 1 is a side elevation partly broken away showing a preferred embodiment of the invention.

FIGURE 2 is a sectional view taken substantially on the lines 2—2 as shown in FIGURE 1.

Referring to the drawings, the finisher device generally designated 10 includes a feed screw 11 rotatably supported on the frame 12 and rotated by means of a belt driven pulley 13. Demountable screens 14 are carried on the frame 12 and enclose the feed screw 11, defining a chamber 15. The stubshaft 16 extends through the circular outlet opening 17 in the frame and is mounted in a bearing assembly 18. The frame 12 and removable cover 19 enclose the screens 14.

A nonrotary cone is carried on the stubshaft 16 and cooperates with the opening 17 to define an annular discharge port 21 between the opening 17 and the cone 20. The cone 20 may be moved axially along its supporting stubshaft 16 by means of an air cylinder assembly 23 having a piston rod 24 connected to a sliding crosshead 25. A plurality of parallel bars 26 pass through sliding guide 27 and connect the cone 20 to the crosshead 25. Air pressure admitted into the assembly 23 through the fitting 28 serves to move the cone 20 toward the feed screw 11, and a spring (not shown) within the assembly 23 retracts the cone 20 away from the feed screw 11 when the air cylinder is vented.

A pulpy mixture of juice and solids is delivered into the chamber 15 through the inlet hopper 30 and rotating feed screw 11 carries the mixture toward the cone 20 which is held in position within the outlet opening 17 by means of air pressure in the cylinder 23. The juice escapes through the enclosing screens 14 and is caught in the collection pan 31 and is carried away through an outlet (not shown). The solid material passes around the nonrotary cone 20 and discharges through the ring orifice 21 into the chute 33.

In accordance with this invention a plurality of curved ribs 35 are fixed to the surface of the cone 20. The ribs are attached to the cone by welding or by suitable fasteners 36. Each rib extends from a relatively small diameter on the cone to a location adjacent the outer edge of the cone, spiraling in the direction of rotation of the screw 11. The end 37 of each rib 35 is blunt near the large diameter of the cone 20 and is pointed at 38 near the small diameter of the cone.

In operation the curved ribs 35 insure that the solid material accumulating near the discharge end of the finisher passes outward through the ring orifice 21 and does not accumulate to plug the discharge end of the device. If desired, a prong 39 of the type shown in said Youd patent is fixed to the end of the feed screw 11, and has clearance with respect to the curved ribs 35.

The air pressure applied to the cylinder assembly 23 is regulated to produce the desired axial force on the nonrotary cone 20, and this holds the desired back pressure on the material within the chamber 15. It has been found that the use of the curved ribs 35 on the cone 20 makes it possible to maintain a higher back pressure on the material in the chamber 15 without danger of plugging the outlet 17 by accumulation of solids.

Having fully described my invention, it is to be understood that I am not to be limited to the details herein set forth but that my invention is of the full scope of the appended claim.

I claim:
1. In a device of the class described having a rotary feed screw and a coaxial nonrotary cone member movable axially with respect to the feed screw within a discharge opening, the improvement comprising: means defining a chamber surrounding said feed screw, said chamber having screen walls and a discharge end confronting said cone member; and a plurality of ribs fixed on the surface of the cone member, each rib extending outward in the direction of rotation of the feed screw;

for more than one-quarter turn around the surface of the cone member.

References Cited

UNITED STATES PATENTS

| | | | |
|---|---|---|---|
| 1,421,283 | 6/1922 | Meakin | 100—148 X |
| 1,534,008 | 4/1925 | Bongardt | 100 |
| 2,340,009 | 1/1944 | Meakin | 100—148 X |
| 2,441,222 | 5/1948 | Fuller | 100—146 X |
| 2,775,191 | 12/1956 | Youd | 100—148 |
| 3,246,595 | 4/1966 | Fisher | 100—147 X |
| 3,288,056 | 11/1966 | Ginaven | 100—98 |

FOREIGN PATENTS 121,870  6/1948  Sweden.

LOUIS O. MAASSEL, *Primary Examiner.*